(12) United States Patent
Sadowski et al.

(10) Patent No.: US 8,446,955 B2
(45) Date of Patent: May 21, 2013

(54) SPECULATIVE MOTION PREDICTION CACHE

(75) Inventors: Greg Sadowski, Cambridge, MA (US); Daniel Wong, Cupertino, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1407 days.

(21) Appl. No.: 11/966,110

(22) Filed: Dec. 28, 2007

(65) Prior Publication Data

US 2009/0168882 A1 Jul. 2, 2009

(51) Int. Cl.
*H04N 7/12* (2006.01)

(52) U.S. Cl.
USPC .................................................. 375/240.16

(58) Field of Classification Search
None
See application file for complete search history.

(56) References Cited

U.S. PATENT DOCUMENTS

| 6,539,392 | B1* | 3/2003 | Rebane | 705/7.31 |
| 2004/0264565 | A1* | 12/2004 | MacInnis | 375/240.01 |
| 2007/0176939 | A1* | 8/2007 | Sadowski | 345/557 |
| 2008/0117981 | A1* | 5/2008 | Lee et al. | 375/240.24 |

OTHER PUBLICATIONS

International Organization for Standardization et al., "Information Technology—Generic Coding of Moving Pictures and Associated Audio Information—Part 7: Advanced Audio Coding (AAC)", ISO/IEC 13818-7, Fourth Edition, (Jan. 15, 2006).

Blu-Ray Disc Association, "Application Definition Blu-ray Disc Format", BD-J Baseline Application and Logical Model Definition for BD-ROM, (Mar. 2005).
International Telecommunication Union, "Series H: Audiovisual and Multimedia Systems, Infrastructure of Audiovisual Services—Coding of Moving Video", Advanced Video Coding for Generic Audiovisual Services, ITU-T Recommendation H.264, (Nov. 2007).
The Society of Motion Picture and Television Engineers, "VC-1 Compressed Video Bitstream Format and Decoding Process", SMPTE 421M-2006, (Feb. 24, 2006).
Tudor, "MPEG-2 Video Compression," Electronics and Communication Engineering Journal (Dec. 1995).
4i2i: H263 Video Coding Tutorial, H.263 Video Coding: An Introduction to the ITU-T H.263 Video Compression Standard: Concepts, Features and Implementation available at http://www.4121.com/h263_video_codec.htm (copyright 2004).

* cited by examiner

*Primary Examiner* — Andrew Lai
*Assistant Examiner* — Leon Andrews
(74) *Attorney, Agent, or Firm* — Volpe and Koenig, P.C.

(57) ABSTRACT

A method and apparatus to improve motion prediction in video processing systems is introduced. When a motion prediction cache completes requesting data for a current macroblock and enters an into idle state, data comprising one or more reference frames is speculatively requested, with the hope that the requested data are will be needed in a subsequent macroblock. If the speculative data is needed, then it is consumed. However, if the speculative data is not needed, then the correct data must be requested and a price is paid for an extra memory read bandwidth. In case the speculative data is the correct data for the subsequent macroblock, the effective memory read latency is reduced and the decode performance increases. The video decoder becomes more immune to memory read latency.

29 Claims, 5 Drawing Sheets

500

600

SPECULATIVE MOTION PREDICTION CACHE

FIELD OF INVENTION

This invention is generally related to video data caches.

BACKGROUND

Contemporary video compression algorithms require significant memory bandwidth for referencing previously decoded images. A decoder memory buffer is used to maintain a number of previously decoded image frames, termed reference frames, ready for display so these frames may be used as references in decoding other image frames. Due to the development and availability of high definition video, the rate at which the data in the decoder memory buffers are transferred has substantially increased. In addition, the decoder memory buffer may provide data blocks that are substantially larger than that required by the decoder to process a particular image block, thereby increasing the memory bandwidth without benefit.

Motion prediction is a commonly used technique for encoding video images. According to conventional video encoding techniques employing motion prediction, successive images are compared and the motion of a particular area in one image relative to another image is determined to generate motion vectors. A "macroblock" is a term used in video compression for such an area; typically a macroblock represents a block of 16×16 pixels. Different picture formats utilize different numbers of pixels and macroblocks. For example, a 1920×1088 HDTV pixel format includes 120×68 macroblocks. To decode a video bitstream, a decoder shifts blocks in a previous picture according to the respective motion vectors to generate the next image. This process is based on the use of intracoded frames, forward predicted frames and bi-directional coded frames as is known in the art.

In some video decoder systems, motion prediction (MP) caches are used to limit the data transfer rate from the memory buffer. An MP cache stores image pixel values for previously decoded macroblocks that may be useful for subsequent macroblocks to be decoded. An MP cache is typically limited in capacity and expensive in comparison to an external memory buffer. An MP cache typically includes only a small portion of the pixel data necessary for a single video frame. Consequently, data in an MP cache is quickly replaced as new macroblocks or parts of macroblocks are written to the cache.

In video decoders, for every macroblock, a set of motion vectors are decoded from a video bitstream and translated into addresses of pixels in the reference frame memory buffers. The pixels are then requested from the memory when they are needed, and are expected to return within a macroblock time period. The time elapsed between the request and the return of the imaging information is called the latency. The latency of a memory system from which the pixels are requested can often be quite high. In such a case the reference image data return slows down the video decoding process, which may cause some frames to be unable to be completed on time for display and, as a result, the frames are dropped. This can lead to a choppy playback. The motion prediction operation is well known to be a major source of the memory read latency bottleneck of a decoder memory system. Accordingly, improvements in memory use and reducing the bottleneck of the system are desired.

SUMMARY

A method and apparatus to improve motion prediction in video processing systems is introduced. When a motion prediction cache completes requesting data for a current macroblock and would typically enter into an idle state, data comprising one or more reference frames is speculatively requested, with the hope that the requested data will be needed in a subsequent macroblock. If the speculative data is needed, then it is immediately consumed. However, if the speculative data is not needed, then the correct data must be requested and a price is paid for an extra memory read bandwidth. In case the speculative data is the correct data for the subsequent macroblock, the effective memory read latency is reduced and the decode performance increases. Thus, the video decoder becomes more immune to memory read latency.

BRIEF DESCRIPTION OF THE DRAWINGS

A more detailed understanding may be had from the following description, given by way of example and to be understood in conjunction with the accompanying drawings wherein.

DETAILED DESCRIPTION

A motion prediction cache (MPC) enables the use of reference image pixel data, (i.e., data which is stored in reference macroblocks), to build other macroblocks. As aforementioned, MPC may be expensive as compared to other types of memories. Preferably, the size of the MPC is sufficient for storage of at least one reference macroblock of prediction pixels, which will enable the MPC to rapidly accommodate all data requests for a current reference macroblock. The size of an MPC may be determined by application specific criteria including various modes of operation and different tile configurations.

During the course of the video decoding process, the MPC would typically experience idle periods. A method to reduce the latency by speculatively requesting data during the idle periods is hereby introduced to take advantage of those idle periods.

Figure 1:
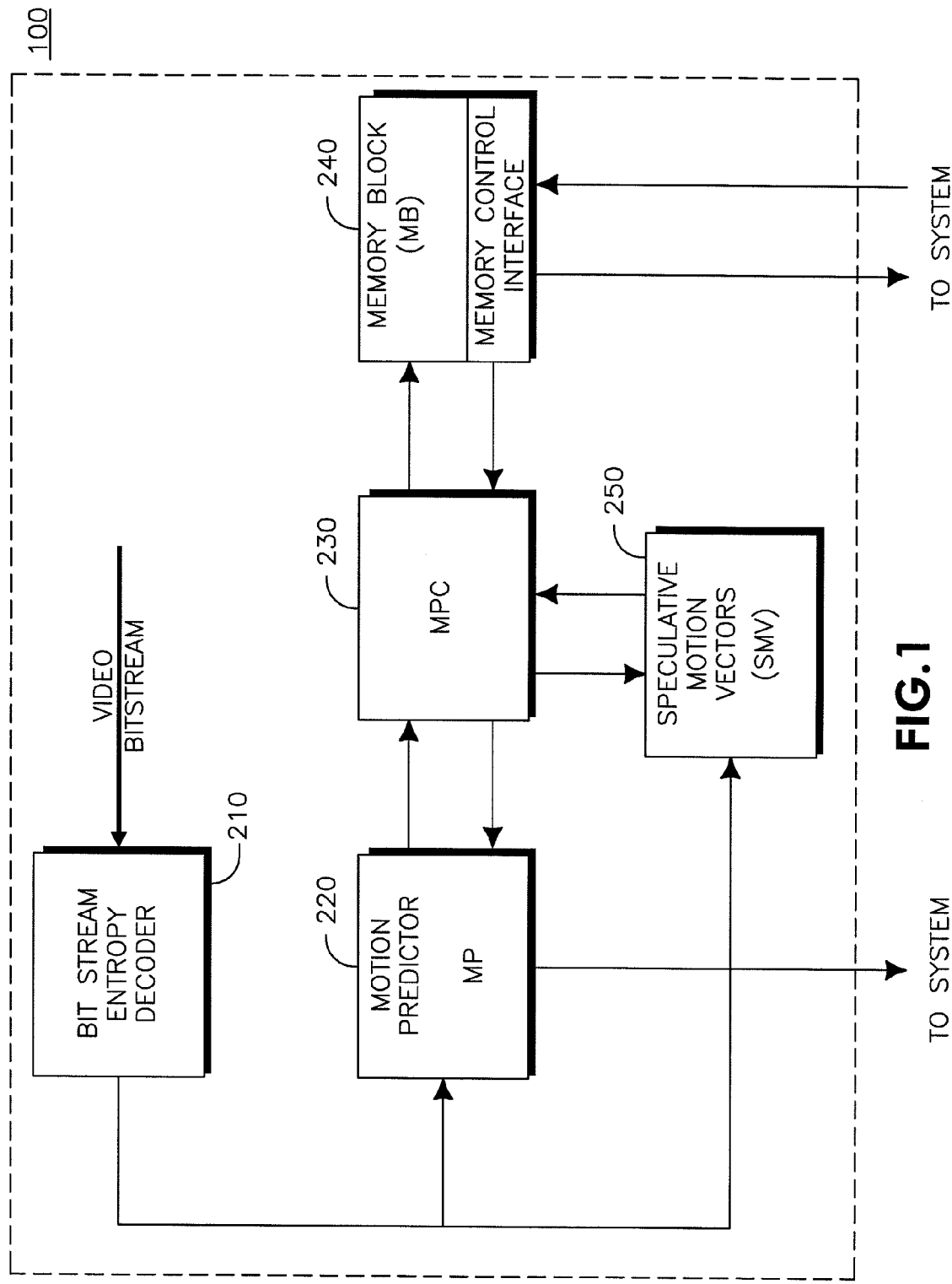
FIG. 1 is block diagram of a system for implementing a speculative motion prediction cache (MPC)

FIG. 1 shows a system 100 for implementing speculative motion prediction. The system 100 includes a bitstream entropy decoder 210, a motion predictor (MP) 220, a motion prediction cache (MPC) 230, a memory block 240, and a speculative motion vectors (SMV) block 250. The bitstream entropy decoder 210 receives a video bitstream and converts the received bitstream into intermediate symbols, quantized coefficients, and motion vector information, (e.g. motion vectors, reference image identifier and macroblock identifier).

The MP 220 receives the motion vector information from the bitstream entropy decoder 210 and transmits a request for reference image data to the MPC 230. The MP 220 then receives the reference image data and outputs a predicted macroblock.

The MPC 230 receives requests from the MP 220 and the SMV block 250 for reference image data for a macroblock, sends data requests to the memory block 240, and receives and stores the requested reference image data for use in building subsequent macroblocks. The MPC 230 also is configured to output a state identifier, which may notify other blocks of its present state for scheduling purposes.

The SMV block 250 receives motion vector information from the bitstream entropy decoder 210, as well as the state identifier from the MPC 230, and outputs data requests for reference image data from the memory block 240 when it determines the MPC 230 has entered, or will enter, on idle period.

The memory block 240 receives memory requests, retrieves the requested reference image data and outputs the requested reference image data.

The aforementioned components of the system 100 will now be discussed in greater detail hereinafter. The bitstream entropy decoder 210 receives a video bitstream and converts it into intermediate symbols, quantized coefficients, and motion vector information, (e.g. motion vectors, reference image identifier, and macroblock identifier.) The particular implementation of the bitstream entropy decoder 210 may vary depending on the application in which it is used. For example, a context-based adaptive binary arithmetic coding (CABAC) bitstream entropy decoder generates intermediate symbols, quantized coefficients, and motion vector information produced by transform-decoding. CABAC decoders may be implemented in an integrated circuit or software for execution on general purpose processors.

The MP 220 predicts motion by using motion vector information of a current macroblock and a reference frame that is typically stored in memory, (in this case the memory block 240). The MP 220 receives a multiplexed data signal including intermediate symbols, quantized coefficients, and motion vector information. An MP 220 may comprise a demultiplexer receiving multiplexed intermediate symbols, quantized coefficients, and motion vector information and outputting demultiplexed motion vector information components, (i.e. include motion vectors, reference image identifiers, and macroblock identifiers). The MP 220 uses the motion vector information components to calculate a memory address. The calculated memory address may contain a cache address, a reference frame number, a macroblock number, or any other type of identification of the location or address of reference image data stored in the memory block 240.

Once the memory address is calculated, a request is generated for the reference image data stored at the particular memory address in the memory block 240. The MP 220 then transmits the request and waits for the requested reference image data to return. When the MP 220 receives the reference image data, it filters the reference image data and reconstructs a macroblock. The reconstructed macroblock is then output to the system for further decoding. The MP 220 output represents a block position on the basis of a predictive error with respect to an appropriate range for the reference image corresponding to the motion prediction reference image.

Figure 3:
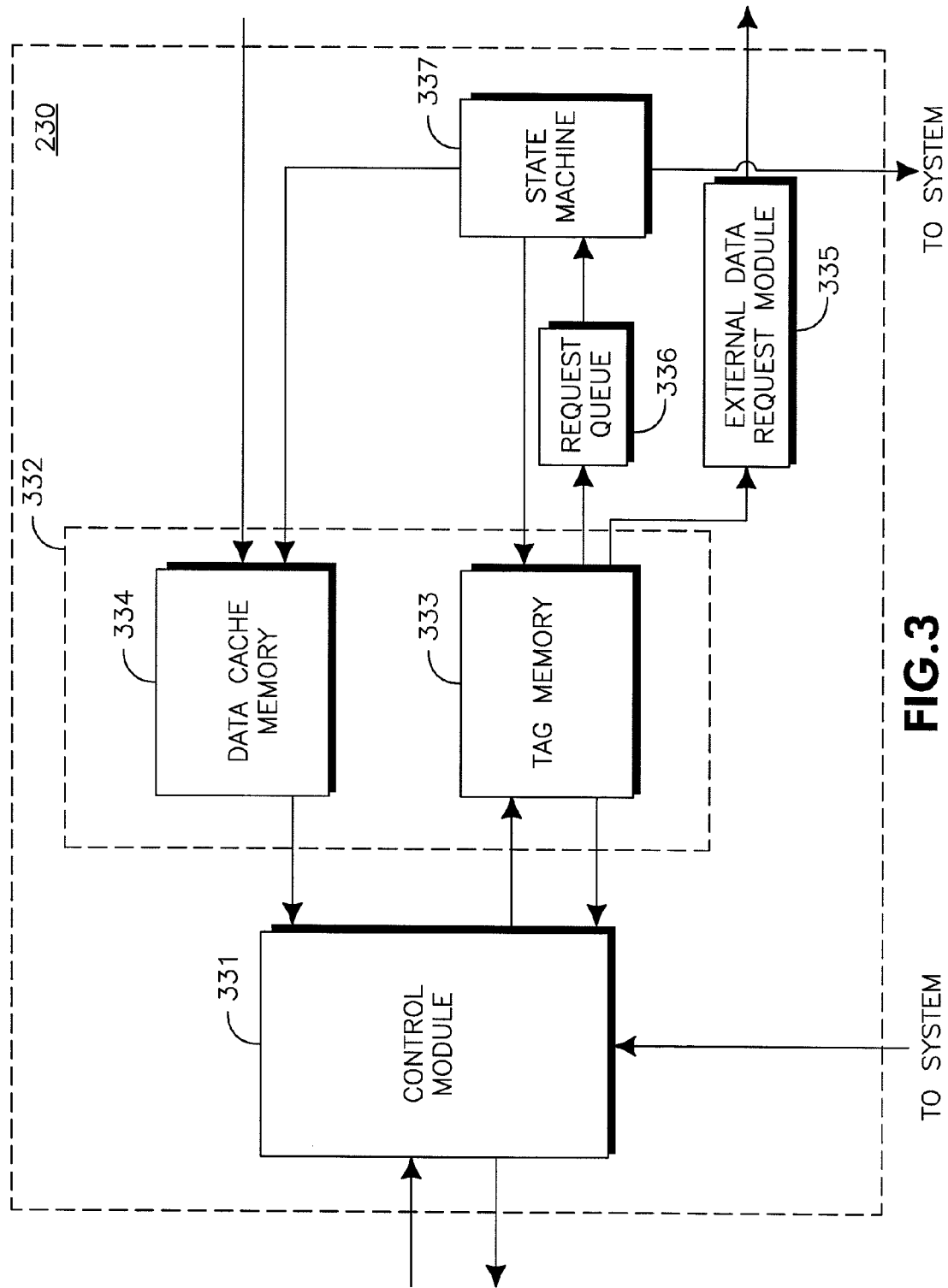
FIG. 3 is a more detailed block diagram of the MPC block of FIG. 1.

Referring to FIG. 3, the MPC 230 of system 100 is shown in greater detail. The MPC 230 enables the MP 220 to use the reference image data to build a macroblock. The MPC 230 may include a control module 331, a motion prediction cache buffer 332 having a tag memory 333 and a data cache memory 334, an external data request module 335, a request queue 336 and a state machine 337. The MPC 230 will respond to a request for reference image data for a current macroblock by requesting the data from the memory block 240 shown in FIG. 1. The request may be received from the MP 220 or the SMV block 250. Optionally, the MPC 230 may be further configured to include a priority for requesting reference image data, wherein the MP 220 requests would have a higher priority, and consequently, a request from the MP 220 would terminate any pending requests from the SMV block 250.

In operation, a request including the calculated address is received at the control module 331. The control module 331 provides overall control of the MPC 230. The data cache memory 334 stores any reference image data that is retrieved from the memory block to 240. The tag memory 333 stores a "tag" or listing of the reference image data blocks that are stored in the data cache memory 334. Any requests for external data from the memory block 240 are handled by the external data request module 335. These requests are also placed into the request queue 336 and monitored by the state machine 337. If the state machine 337 observes that a request including a particular address for reference image data was previously requested and is stored in the data cache memory 334, the state machine 337 enables the data cache memory 334 to forward the previously retrieved data to the control module 331. This process will be described in greater detail hereinafter. The control module 331 examines the request and searches the tag memory 333 to determine if the address associated with the request is stored in the tag memory 333. If so, it means that the associated reference image data is stored in the data cache memory 334. If the search of the tag memory is unsuccessful, meaning the requested reference image data is not stored in the MPC 230, a request to the memory block 240 is made by the external data request module 335.

The tag memory 333 is written with at least some of the parameters in the request. If the search was successful, meaning the requested reference image data is already stored in the data cache memory 334, the data is read from the data cache memory 334 to the control module 331 and then to the MP 220.

Regardless of whether or not the search of the tag memory 333 was successful, the search parameters are written to the request queue 336 and, if the request queue 336 is not full, the next request received is serviced. When the MPC 230 has completed requesting data for a current data block, which may be indicated by an empty request queue 336, the state machine 337 transmits a signal indicating that it has entered into an idle state. If the MPC 230 receives a request from the SMV block 250 during the idle state, the MPC 230 can speculatively request reference image data from the memory block 240. This request is processed in the same manner as the request from the MP 220. The requested reference image data will be stored in the data cache memory 334 and the associated tag will also be stored in the tag memory 333 with the hope that the reference image data will be needed for a subsequent macroblock.

Figure 2:
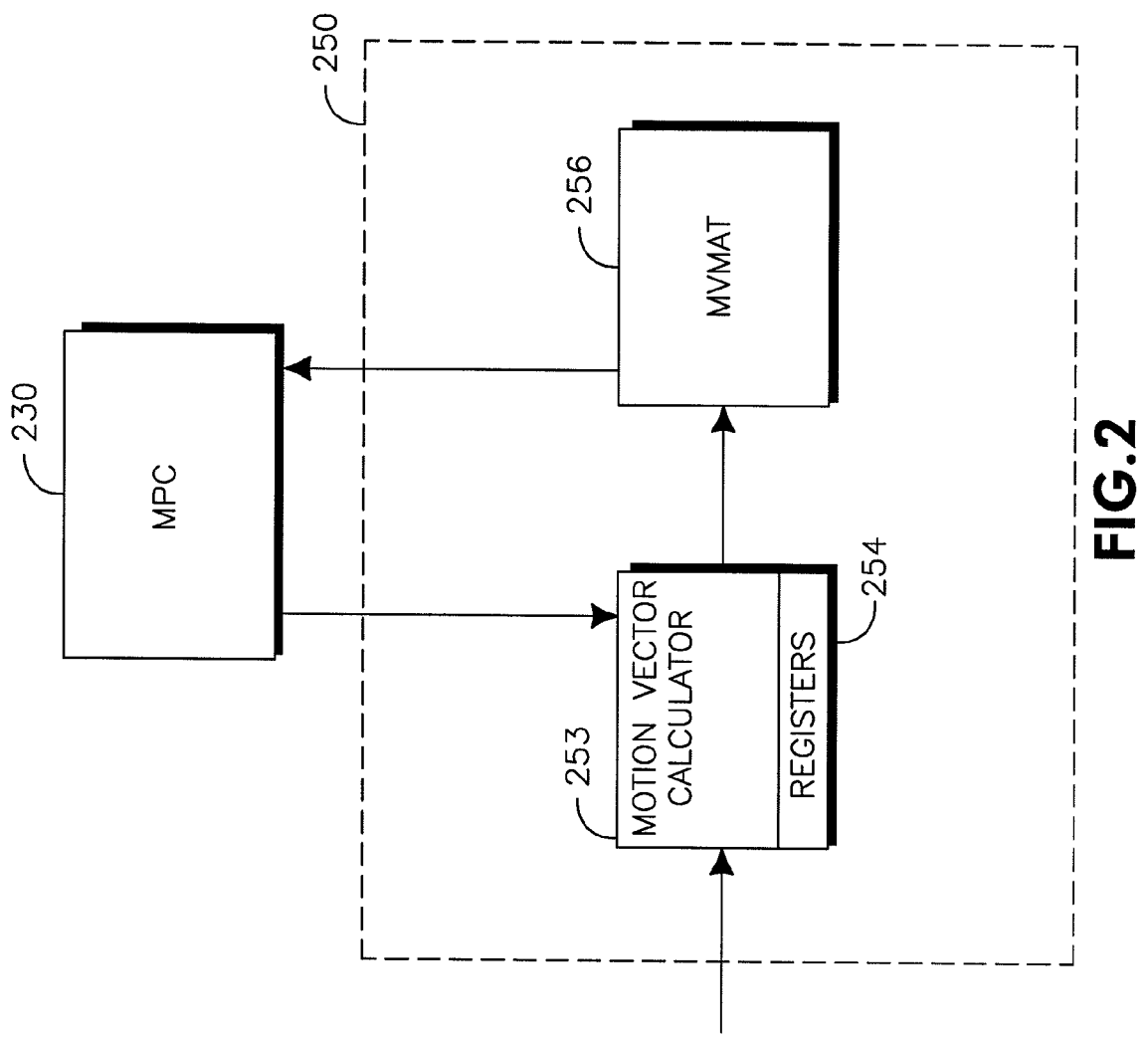
FIG. 2 is a block diagram of the speculative motion vector block of FIG. 1.

Referring to FIG. 2, the SMV block 250 of FIG. 1 is shown in greater detail. The SMV block 250 generates "speculative" data requests for the MPC 230, when the MP 220 to MPC 230 data flow is idle. A speculative data request is not a request for reference image data that is needed, (as is the case with a request from the MP 220), rather it is a request for reference image data that might be needed.

Ideally, when the MP 220 is ready to request data for a subsequent macroblock, the MPC 230 will have already requested the reference image data from the memory block 240 based on the requests that originate from the SMV block 250 during a period where the MPC 230 would otherwise be in an idle state.

The SMV block 250 includes a motion vector calculator 253, a register 254, and a motion vector memory to address translator (MVMAT) 256. The motion vector calculator 253 receives motion vector information, (e.g. macroblock information, motion vectors, mode, and reference image information, and a frame start data field), from the bitstream entropy decoder 210. A register 254 is provided to store the trend of the motion vector direction based on the past motion vectors. A moving window average of recent trends in the motion vector direction is calculated based on the received information, using extrapolation techniques. This average is used to generate a speculatively predicted motion vector for a subsequent macroblock. The speculatively predicted motion vector is sent to the MVMAT 256, which translates the vector into a corresponding memory address in the memory block 240. The MVMAT 256 then generates a data request for the data located at the selected memory address.

It should be understood that the SMV block 250 may employ a number of methods to speculate the motion vectors for a subsequent macroblock. For example, if a video decoder is operating in a horizontal scan mode, (e.g. the HD resolutions in H.264 and VC-1 standards), the speculative motion vectors may be the same as the current vectors, or the average of vectors from the left macroblock, the top-left macroblock and top macroblock. Alternatively, the SMV block 250 could maintain a running average of the motion per macroblock and extrapolate from the running average. There are many other similar methods that may be implemented. The particular method may be chosen adaptively based on the decoding performance, which is measurable.

Referring back to FIG. 1, the system 100 also includes a memory block 240. As aforementioned, the memory block 240 receives requests for reference data from the MPC 230, and additionally from other parts of the system 100. The memory block 240 may include a memory control interface (MCI) 242 and a reference frame memory buffer 244. The MCI 242 manages the control and timing of data transfers, bus arbitration, and memory access. Additionally, the MCI 242 may provide a dedicated channel to transfer image data that may be stored in the memory block 240. The memory block 240 stores reference image data for later retrieval upon request. In the present embodiment, the reference frame memory buffer 244 comprises dynamic random access memory (DRAM). Alternatively, the reference frame memory buffer 244 may comprise an SRAM, virtual memory, flash memory, or any other accepted memory buffer.

Figure 4:
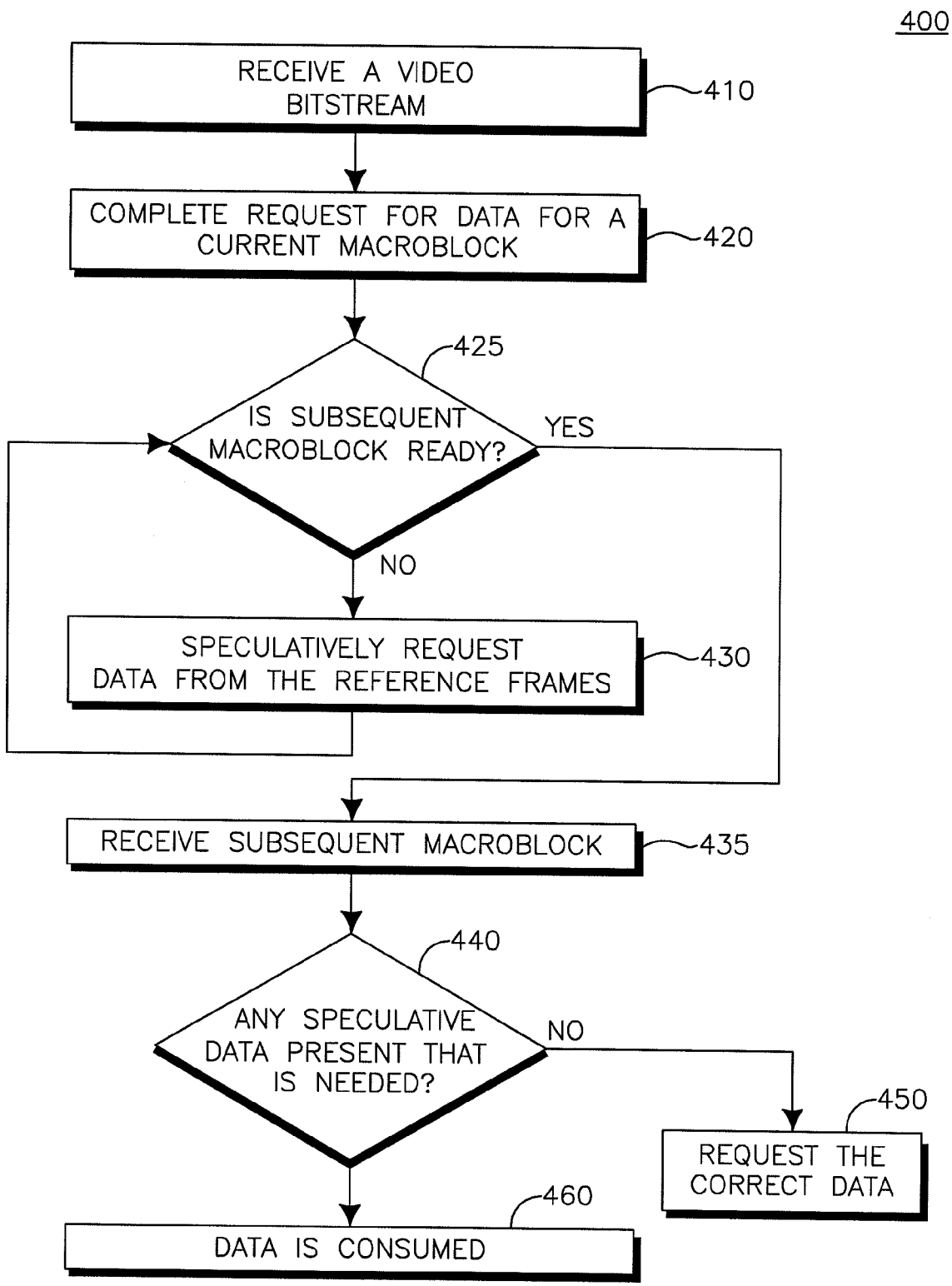
FIG. 4 is a process of reducing the memory read latency of a motion prediction system.

The process of reducing the memory read latency of a motion prediction system is shown in FIG. 4. A video bitstream is received (step 410). The video bitstream is used to calculate motion vectors which are then used to calculate the addresses of reference image data for a current macroblock. The MP 220 requests reference image data corresponding to the calculated reference frame addresses. The MPC 230 receives the data requests, and requests the reference image data from the memory block 240. After the requested reference image data has been received by the MPC 230 (step 420), a determination is made as to whether reference image data for a new macroblock is ready to be requested (step 425). If the reference image data for the new macroblock is not ready to be requested, (i.e. the MP 220 has not calculated the addresses of reference image data for a new macroblock), and the MPC 230 would otherwise enter an idle state, reference image data in the memory block 240 is speculatively requested (step 430). The speculative data request can be for a full macroblock of data or less than a full macroblock. The actual amount of data that is speculatively received is dynamically adjusted based on the decoding status of the present macroblock. Thereafter, the MP 220 is ready to request reference image data for a new macroblock (steps 435).

A determination is then made as to whether the reference image data that has been speculatively requested is the reference image data that corresponds with the data that is requested by the MP 220 for the subsequent image (step 440). If the data is needed, the data is immediately consumed (step 460). However, if the speculatively requested data is not needed, then the correct reference image data must be requested (step 450) and the speculatively requested data must be purged.

Figure 5:
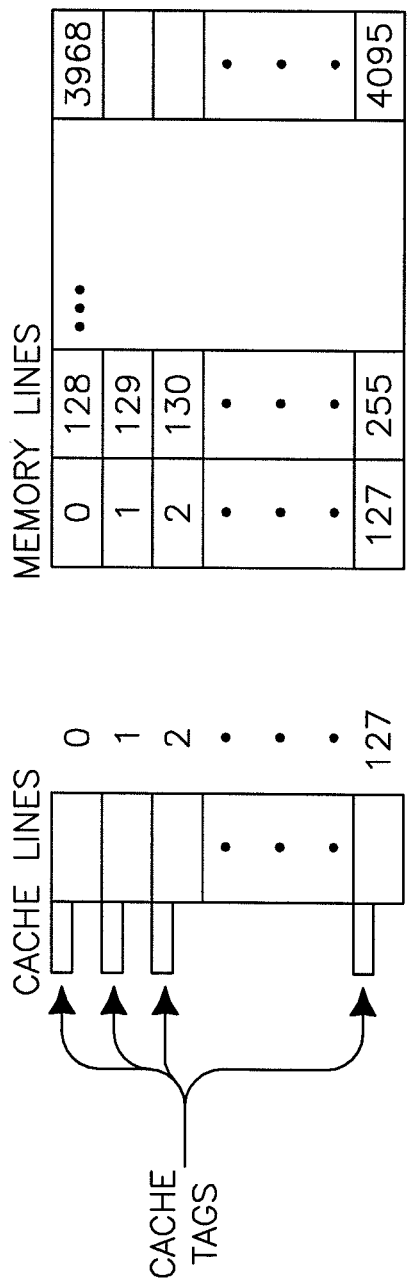
FIG. 5 is diagram of a memory cache of an MPC using direct mapping.
Figure 6:
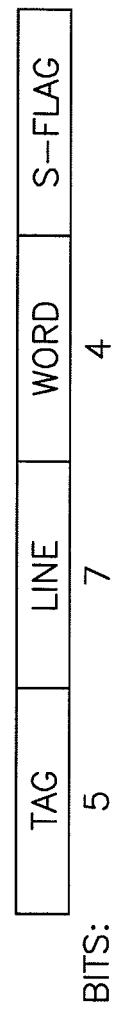
FIG. 6 is a diagram of a cache tag identifying a speculatively tagged data.

In the event the speculatively requested data is not used, it may be preferable to purge the tag memory 333 of the unused speculative data in a more efficient manner. FIG. 5 shows a motion prediction cache buffer 332 of the MPC 230 in greater detail. Each location in each memory has a datum, called a cache line, which may range in size in depending upon the system design. Each location in each memory also has an index, (usually the lower order digits of the address), which is used to address a word in the cache. The remaining high-order bits in the address, called the tag, are stored in the motion prediction cache buffer 332 along with the data. When a request is received at the control module 331, the control module 331 examines the request and searches the tag memory 333 associated with the request. In the event that the control module 331 searches the tag memory 333 and determines that the reference image data is not found in the motion prediction cache buffer 332, the search will be deemed unsuccessful. In the event the cache tags searched were speculatively requested, they will then be purged to make room for additional memory requests. In order to further streamline the above process, the cache tags may be modified to include an "s-flag", as shown in FIG. 6, so the cache lines that were speculatively requested, if not used in the current macroblock could be easily identified by the 5-flag and, thus, purged first.

The potential advantages offered as compared to known art include enabling the Blu-ray, HD-DVD support of high-definition video on low-end chips. Additionally it could enable dual HD video support.

Although the features and elements are described in particular combinations, each feature or element can be used alone without the other features and elements or in various combinations with or without other features. The methods or flow charts provided may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

What is claimed is:
1. A method for a motion prediction implemented in a video compression system, the method comprising:
   the video compression system receiving motion vector information for a first image;
   the video compression system generating a speculative motion vector from the received motion vector information;
   the video compression system obtaining reference frame data based on the speculative motion vector;

the video compression system receiving motion vector information for a subsequent image; and the video compression system determining whether said obtained reference frame data corresponds to said motion vector information for said subsequent image and, if so, using said obtained reference frame data to construct at least a portion of said subsequent image.

2. The method of claim 1 further comprising:

the video compression system transmitting a state identifier by a motion prediction cache (MPC), notifying the other blocks of its present state; and the video compression system scheduling the request for reference frame data using the state identifier.

3. The method of claim 2, wherein the scheduling the request for the reference frame data occurs when the state identifier indicates an idle state.

4. The method as in claim 3 further comprising:

the MPC receiving a request for the reference frame data; and requesting the reference frame data from a system memory.

5. The method of claim 1, further comprising:

the video compression system receiving speculative reference frame data;

the video compression system determining that the reference frame data is needed for a macroblock; and the video compression system storing the reference frame data.

6. The method of claim 1 further comprising:

requesting a macroblock of reference frame data.

7. The method of claim 1, wherein the motion vector information comprises a current macroblock identifier, at least one motion vector, and at least one reference frame identifier.

8. The method of claim 1, comprising:

selecting a plurality of speculative motion vectors adaptively to a measured decoding performance.

9. The method of claim 1, further comprising:

modifying a plurality of cache tags to include a flag identifying data as a plurality of speculative cache data.

10. The method as in claim 8, further comprising:

removing a plurality of speculative cache data lines, associated with the speculative cache data, when the speculative cache data are not used in a current macroblock.

11. The method of claim 1, further comprising:

determining a plurality of trends in a motion vector direction;

generating a moving window average of the plurality of trends in the motion vector direction; and generating a plurality of speculative motion vectors based on the moving window average.

12. The method of claim 1 wherein, the motion vector information is for a portion of a frame.

13. The method of claim 12 wherein the portion of the frame is a macroblock.

14. A system for a motion prediction implemented in video compression, the system comprising:

a bitstream entropy decoder configured to decode a received bitstream;

a motion predictor configured to predict motion of a bitstream a motion prediction cache (MPC) configured to request and store reference frame data; and a speculative motion vectors block (SMV) configured to speculatively request reference frame data, to receive motion vector information, and to generate a speculative motion vector from the received motion vector information.

15. The system of claim 14 further comprising:

the MPC configured to transmit a state identifier.

16. The system of claim 15, further comprising:

the SMV configured to receive the state identifier, and schedule a request for reference frame data when the state identifier indicates an idle state.

17. The system of claim 14 further comprising:

the MPC configured to receive a request for the reference frame data, and request the reference frame data from a system memory.

18. The system of claim 14 further comprising:

the SMV configured to generate a request for reference frame data based on the speculative motion vector, and to transmit the request for speculative reference frame data.

19. The system of claim 14, further comprising:

the MPC further configured to receive the speculative reference frame data and to determine whether the reference frame data is needed for a macroblock; and if so, to store the reference frame data.

20. The system of claim 14 further comprising:

the SMV configured to request a macroblock of reference frame data.

21. The system of claim 14, wherein the motion vector information comprises a current macroblock identifier, at least one motion vector, and at least one reference frame identifier.

22. The system of claim 14, comprising:

the SMV configured to select the speculative motion vectors adaptively to a measured decoding performance.

23. The system as in claim 14, further comprising:

the MPC configured to include a flag on a plurality of cache tags to identify data as speculative cache data.

24. The system of claim 23, further comprising:

the MPC configured to remove a plurality of speculative cache data lines associated with the speculative cache data first, when the speculative cache data are not used in a current macroblock.

25. The system of claim 14, further comprising:

the SMV configured to determine a plurality of trends in a motion vector direction, to generate a moving window average of the plurality of trends in the motion vector direction, and to generate the speculative motion vectors based on the moving window average.

26. A system for a motion prediction implemented in video compression, the system comprising:

a bitstream entropy decoder configured to decode a received bitstream;

a motion predictor configured to predict motion of a bitstream a motion prediction cache (MPC) configured to request and store reference frame data, and to transmit a state identifier; and a speculative motion vectors block (SMV) configured to speculatively request reference frame data, and to receive the state identifier, and schedule a request for reference frame data when the state identifier indicates an idle state.

27. A system for a motion prediction implemented in video compression, the system comprising:

a bitstream entropy decoder configured to decode a received bitstream;

a motion predictor configured to predict motion of a bitstream a motion prediction cache (MPC) configured to request and store reference frame data; and a speculative motion vectors block (SMV) configured to speculatively request reference frame data, and to select the speculative motion vectors adaptively to a measured decoding performance.

28. A system for a motion prediction implemented in video compression, the system comprising:
- a bitstream entropy decoder configured to decode a received bitstream;
- a motion predictor configured to predict motion of a bitstream
- a motion prediction cache (MPC) configured to request and store reference frame data, to include a flag on a plurality of cache tags to identify data as speculative cache data, and to remove a plurality of speculative cache data lines associated with the speculative cache data first, when the speculative cache data are not used in a current macroblock; and
- a speculative motion vectors block (SMV) configured to speculatively request reference frame data.

29. A system for a motion prediction implemented in video compression, the system comprising:
- a bitstream entropy decoder configured to decode a received bitstream;
- a motion predictor configured to predict motion of a bitstream
- a motion prediction cache (MPC) configured to request and store reference frame data; and
- a speculative motion vectors block (SMV) configured to speculatively request reference frame data, and to determine a plurality of trends in a motion vector direction, to generate a moving window average of the plurality of trends in the motion vector direction, and to generate the speculative motion vectors based on the moving window average.

* * * * *